UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

YELLOW DYE AND PROCESS OF MAKING SAME.

SPECIFICATION forming part of Letters Patent No. 618,000, dated January 17, 1899.

Application filed December 27, 1897. Serial No. 663,724. (Specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of New Mordant-Dyeing Coloring-Matters, (for which patents were obtained in Germany March 12, 1895, No. 85,390; in France September 20, 1895, No. 250,422, and in England September 21, 1895, No. 17,660,) of which the following is a specification.

My invention consists in the manufacture of new yellow mordant-dyeing coloring-matters by the suitable oxidation of aromatic hydroxycarboxylic acids. The said oxidation may be effected in sulfuric-acid solution by the use of a chemical oxidizing agent, such as a persulfate, or it may be effected by treating the sulfuric-acid solution of the hydroxycarboxylic acid by means of electricity and at the positive pole of an electric cell. The coloring-matters obtained dye chrome-mordanted wool, giving fine strong yellow shades, possessing great fastness against the action of light and milling.

The following examples will serve to illustrate the manner in which my invention can best be carried into practical effect. The parts are by weight.

*Example 1. Oxidation of symmetrical metadihydroxybenzoic acids with ammonium persulfate.*—Dissolve about ten parts of symmetrical metadihydroxybenzoic acid in about two hundred parts of cold concentrated sulfuric acid (containing about ninety-five per cent. $H_2SO_4$) and add about fifteen parts of ammonium persulfate slowly at the ordinary temperature. A rise of temperature above about 50° centigrade must be avoided. After the mixing is effected continue to stir for about twelve hours. The melt assumes a brown-yellow color. Pour the whole into about one thousand parts of cold water and collect the coloring-matter which separates out on a filter, wash, and preserve for use in the form of paste.

*Example 2. Oxidation of symmetrical metadihydroxybenzoic acid by means of electricity.*—Suspend about ten parts of symmetrical metadihydroxybenzoic acid in about forty parts of sulfuric acid, (containing about sixty-three per cent. $H_2SO_4$.) Place this mixture in an electrolytic cell at the positive pole, while the negative pole is surrounded by sulfuric acid, separated from the mixture by a suitable diaphragm. Keep the mixture cool at a temperature, say, between 10° and 20° centigrade, stir thoroughly, and pass the current through the cell. Good results can be obtained by using a tension of about eight volts and a current of about twenty amperes per square decimeter of anode surface; but these conditions can be varied. Continue the treatment till no metadihydroxybenzoic acid remains unchanged. Pour into cold water, filter, and wash.

The product resulting according to both examples is identical. It dyes wool mordanted with chrome or with alumina in fine strong yellow shades which possess great fastness. A fine yellow can also be obtained on cotton with the aid of an alumina mordant. The coloring-matters form a yellow to greenish-yellow paste, or in the dry state a greenish-yellow powder. It is soluble in and can be crystallized from glacial acetic acid or from alcohol. It is hardly soluble in water even on boiling. It dissolves in concentrated sulfuric acid, yielding a yellow solution. With sodium carbonate it gives first a yellow and then a green solution, and in the presence of an excess a yellow solution with a brown precipitate.

In the above examples the concentration of the sulfuric- acid may vary within very wide limits. A higher temperature may be applied, or a larger quantity of oxidation agent can be used, and when an electric current is used its quantity and tension can be varied.

This invention can be applied to a large number of aromatic hydroxycarboxylic acids—such as, for instance, salicylic acid, meta and para hydroxybenzoic acid, cresotic acid, symmetrical metadihydroxybenzoic ethyl ester, symmetrical metadihydroxybenzoic anilid, gallic acid, gallic ethyl ester, gallaminic acid, gallanilid, tannin, protocatechuic acid, beta-resorcylic acid, and the like. The products obtained possess similar properties to those described.

What I claim as new, and desire to secure by Letters Patent, is—

1. The process for the manufacture of new yellow mordant-dyeing coloring-matters by subjecting an aromatic hydroxycarboxylic acid in sulfuric-acid solution to the action of a persulfate, substantially as hereinbefore described.

2. The process for the manufacture of new yellow mordant-dyeing coloring-matters which consists in the oxidation of an aromatic hydroxycarboxylic acid, in sulfuric-acid solution substantially as described.

3. As a new article of manufacture the new yellow mordant-dyeing coloring-matter which is obtained by oxidizing the symmetrical metadihydroxybenzoic acid and which occurs as a yellow to greenish-yellow paste or powder; it is hardly soluble in water even on boiling, it dissolves in concentrated sulfuric acid yielding a yellow solution, with sodium carbonate it gives first a yellow, then a green solution, and in the presence of an excess a yellow solution with a brown precipitate, all substantially as hereinbefore described.

4. As a new article of manufacture the new yellow mordant-dyeing coloring-matters which are obtained by oxidation of an aromatic hydroxycarboxylic acid, and which dye chrome-mordanted wool in yellow shades, having great fastness to light and milling; they are soluble in, and can be crystallized from glacial acetic acid or alcohol; with concentrated sulfuric acid they give yellow, with sodium-carbonate solution they give first yellow and then green and in the presence of an excess a yellow solution with a brown precipitate, substantially as described.

In testimony whereof I have hereunto set my hand in the presence of two subscribing witnesses.

OSCAR BALLY.

Witnesses:
GUSTAV L. LIETTENBERGER,
BERNHARD C. HESSE.